United States Patent
Laird et al.

(10) Patent No.: US 9,739,382 B2
(45) Date of Patent: Aug. 22, 2017

(54) FLUID DISTRIBUTION VALVE

(75) Inventors: Stephen Laird, Edinburgh (GB); Onno Kuttler, Dalkeith (GB); Luke Wadsley, Ames, IA (US)

(73) Assignees: Danfoss Power Solutions Aps, Nordborg (DK); Artemis Intelligent Power Ltd., Loanhead, Scotland (GB)

( * ) Notice: Subject to any disclaimer, the term of this patent is extended or adjusted under 35 U.S.C. 154(b) by 301 days.

(21) Appl. No.: 13/128,717

(22) PCT Filed: Nov. 17, 2009

(86) PCT No.: PCT/DK2009/000240
§ 371 (c)(1),
(2), (4) Date: May 11, 2011

(87) PCT Pub. No.: WO2010/057494
PCT Pub. Date: May 27, 2010

(65) Prior Publication Data
US 2011/0220230 A1 Sep. 15, 2011

(30) Foreign Application Priority Data

Nov. 18, 2008 (EP) .................................... 08020083

(51) Int. Cl.
*F16K 11/04* (2006.01)
*F16K 31/06* (2006.01)
(Continued)

(52) U.S. Cl.
CPC ............ *F16K 11/04* (2013.01); *F04B 7/0076* (2013.01); *F04B 13/02* (2013.01);
(Continued)

(58) Field of Classification Search
CPC ...... F04B 1/053; F04B 1/0413; F04B 1/0452; F04B 7/0076; F04B 53/1082; F04B 13/02;
(Continued)

(56) References Cited

U.S. PATENT DOCUMENTS 737,809 A * 9/1903 Whitaker ...................... 417/558
758,183 A * 4/1904 Kryszat ......................... 417/558
(Continued)

FOREIGN PATENT DOCUMENTS

| JP | 2008-518408 A | 5/2008 |
|---|---|---|
| WO | 2004111509 A1 | 12/2004 |
| WO | 2007034301 A1 | 3/2007 |

OTHER PUBLICATIONS

International Search Report for PCT/DK2009/000240 dated Dec. 11, 2009.
(Continued)

*Primary Examiner* — Craig Schneider
*Assistant Examiner* — Frederick D Soski
(74) *Attorney, Agent, or Firm* — McCormick, Paulding & Huber LLP

(57) ABSTRACT

The invention relates to a fluid distribution valve (1, 25, 29, 37, 43), comprising at least a first fluid port (2), a second fluid port (3) and a third fluid port (4). These ports are connecting to a fluid distribution chamber (5). The second fluid port (3) can be selectively connected to the first fluid port (2) and/or the third fluid port (4) through said distribution chamber (5). The second fluid port (3) is arranged between the first fluid port (2) and the third fluid port (4).

20 Claims, 10 Drawing Sheets

(51) Int. Cl.
*F04B 7/00* (2006.01)
*F04B 53/10* (2006.01)
*F04B 13/02* (2006.01)

(52) U.S. Cl.
CPC ...... *F04B 53/1082* (2013.01); *F16K 31/0624* (2013.01); *Y10T 137/86493* (2015.04)

(58) Field of Classification Search
CPC ..... F02M 59/102; F16K 11/044; F16K 11/04; F16K 31/0624; Y10T 137/86493; Y10T 137/8667; Y10T 137/86694
USPC ............ 137/625.65, 625.33, 565.01, 565.11, 137/565.15, 565.23, 565.26, 596.2; 417/269, 273, 454, 505, 559
See application file for complete search history.

(56) References Cited

U.S. PATENT DOCUMENTS

| | | | | |
|---|---|---|---|---|
| 1,950,911 | A * | 3/1934 | Zahodiakin | 123/79 C |
| 2,327,269 | A * | 8/1943 | Jessup | 417/507 |
| 2,439,618 | A * | 4/1948 | Cloutier | 123/79 C |
| 2,756,732 | A * | 7/1956 | Olson | 123/79 C |
| 2,979,046 | A * | 4/1961 | Buchi | 123/79 C |
| 3,055,350 | A * | 9/1962 | Buchi | 123/79 C |
| 3,164,364 | A * | 1/1965 | McColl | 251/334 |
| 3,192,953 | A * | 7/1965 | Wolf et al. | 137/614.19 |
| 3,584,981 | A * | 6/1971 | Worster | 417/542 |
| 4,370,103 | A * | 1/1983 | Tripp | 417/298 |
| 4,664,150 | A | 5/1987 | Steiger | |
| 4,758,135 | A * | 7/1988 | Woodward | F04B 53/007 277/511 |
| 4,865,521 | A * | 9/1989 | Ise et al. | 417/187 |
| 4,878,815 | A * | 11/1989 | Stachowiak | F04B 53/1025 137/454.4 |
| 4,893,592 | A * | 1/1990 | Falero | 123/79 C |
| 5,338,160 | A | 8/1994 | Thurner | |
| 5,362,216 | A * | 11/1994 | Hammelmann | F04B 53/007 137/512.3 |
| 5,782,267 | A * | 7/1998 | Yoo | 137/596.17 |
| 6,231,323 | B1 * | 5/2001 | Jezek | F04B 53/1025 137/493.8 |
| 6,382,940 | B1 * | 5/2002 | Blume | F04B 53/007 277/435 |
| 6,546,902 | B1 * | 4/2003 | Davis | 123/79 C |
| 6,651,545 | B2 | 11/2003 | Nippert | |
| 6,971,344 | B2 * | 12/2005 | Hirano | 123/79 C |
| 7,300,260 | B1 | 11/2007 | Gandrud | |
| 7,444,989 | B2 * | 11/2008 | Shafer et al. | 123/446 |
| 7,540,230 | B2 * | 6/2009 | Rojanskiy et al. | 91/323 |
| 2001/0031207 | A1 * | 10/2001 | Maeda et al. | 417/298 |
| 2002/0023682 | A1 | 2/2002 | Tokuda et al. | |
| 2006/0027773 | A1 * | 2/2006 | Nordstrom et al. | 251/129.15 |
| 2006/0065315 | A1 * | 3/2006 | Neff et al. | 137/625.65 |
| 2006/0093909 | A1 | 5/2006 | Zhang | |
| 2007/0041850 | A1 * | 2/2007 | Ganzel | 417/273 |
| 2007/0251588 | A1 | 11/2007 | Linder et al. | |
| 2008/0152523 | A1 * | 6/2008 | Jensen | F04B 53/1032 417/571 |
| 2008/0289707 | A1 * | 11/2008 | Murgai | 137/625.65 |

OTHER PUBLICATIONS

Chinese Office Action for Application Serial No. 200980154695.6 dated Dec. 26, 2012.
European Search Report for Application No. EP08020083 dated Jun. 2, 2009.

* cited by examiner

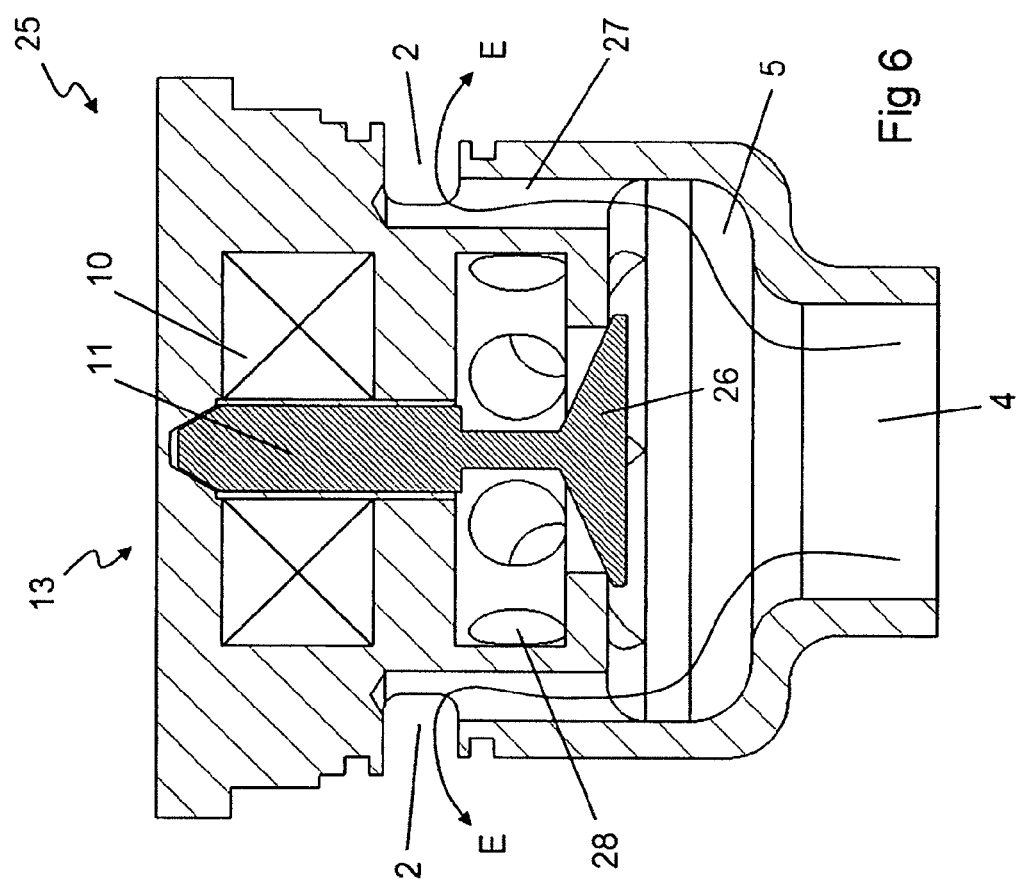

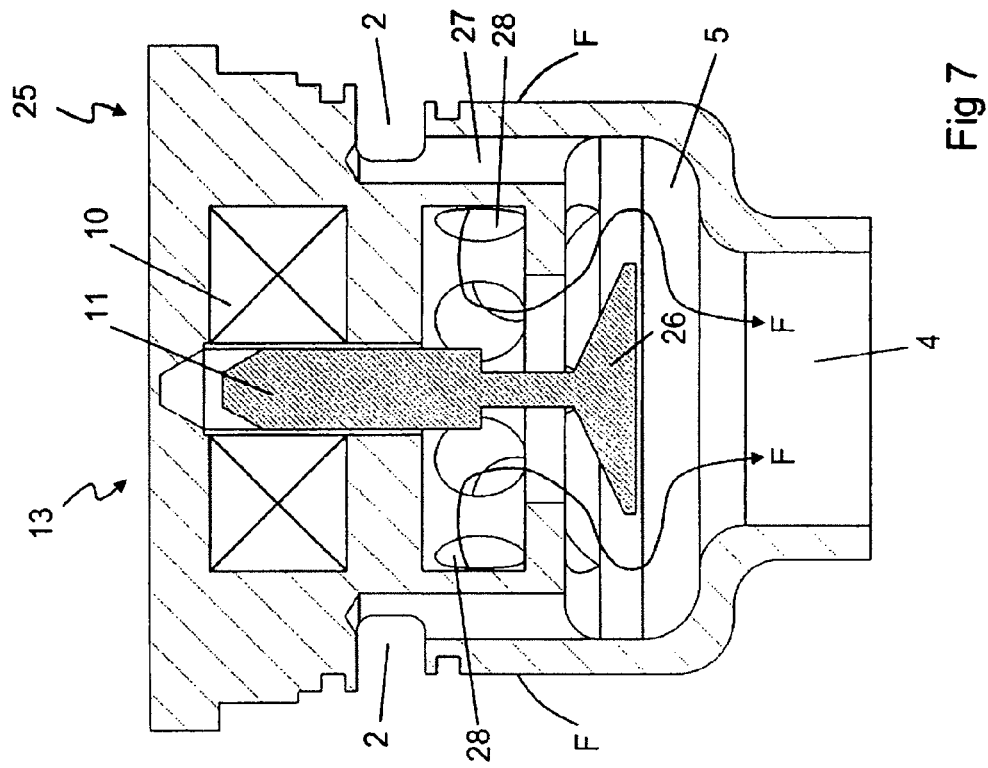
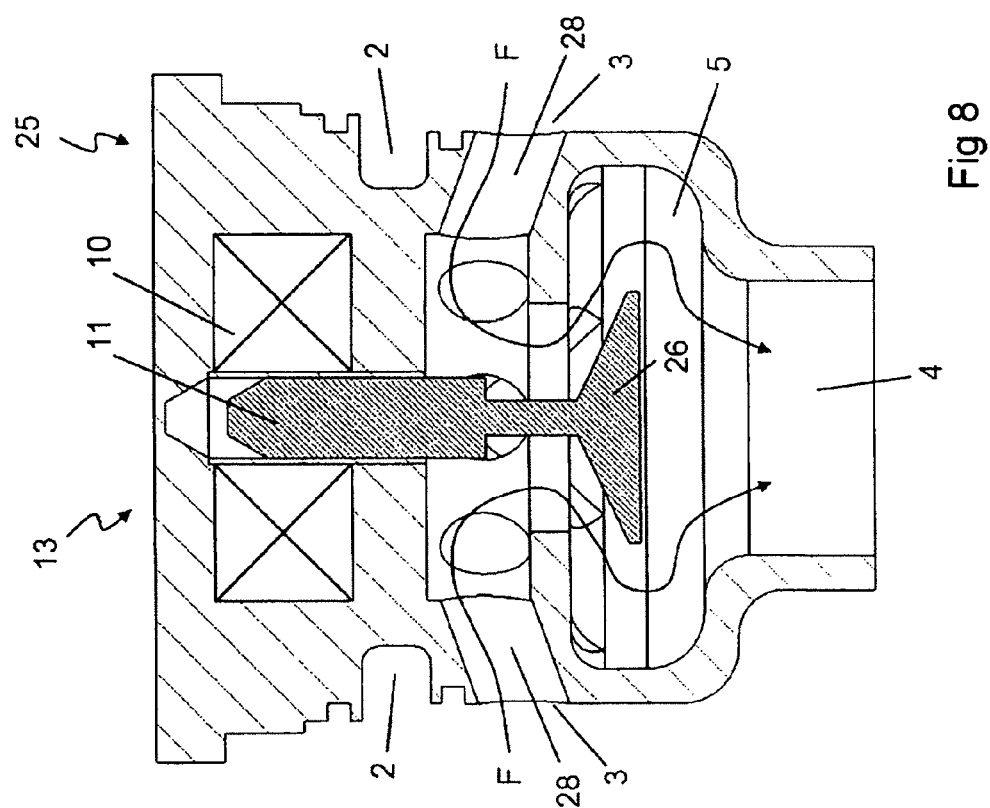

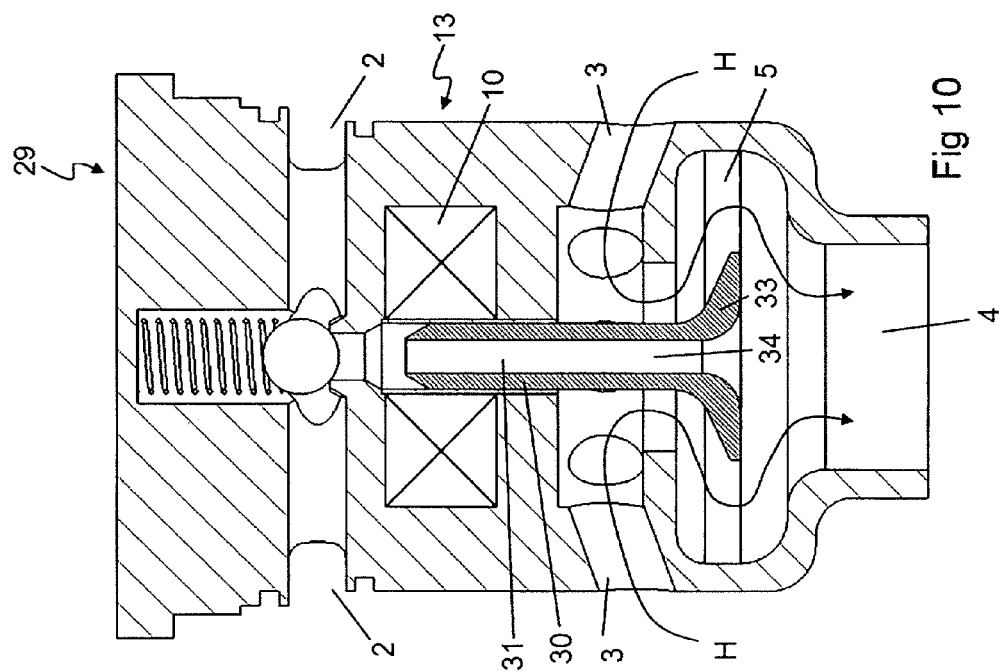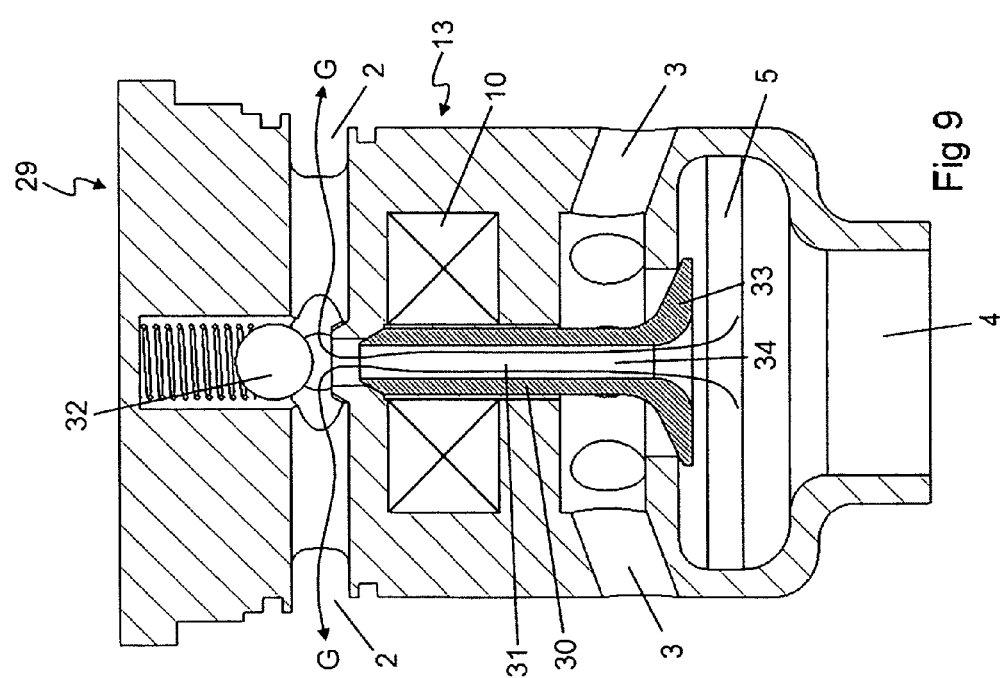

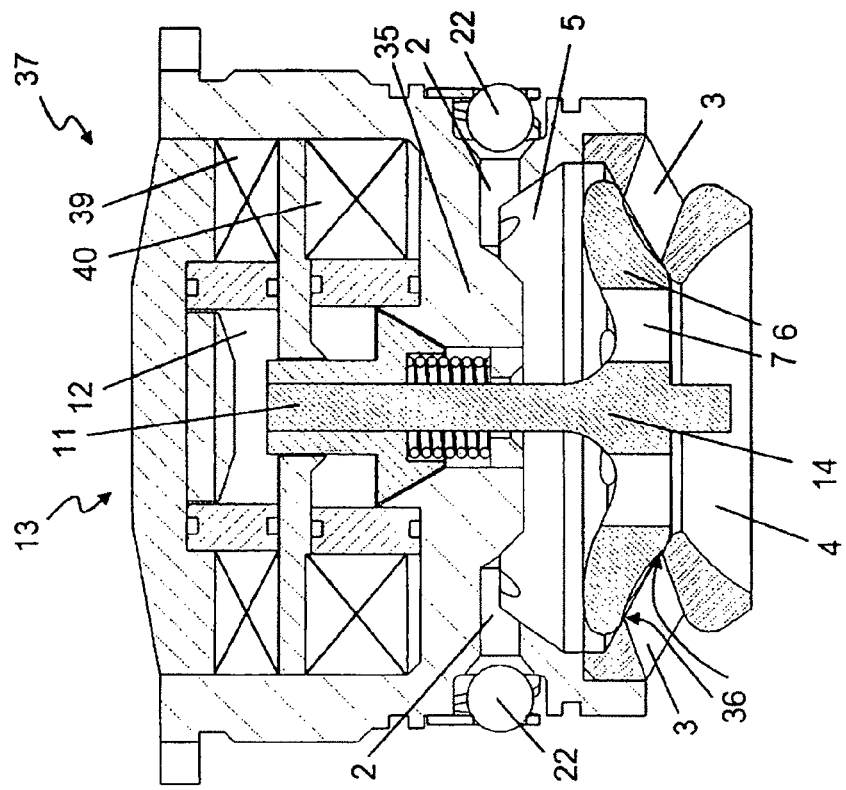
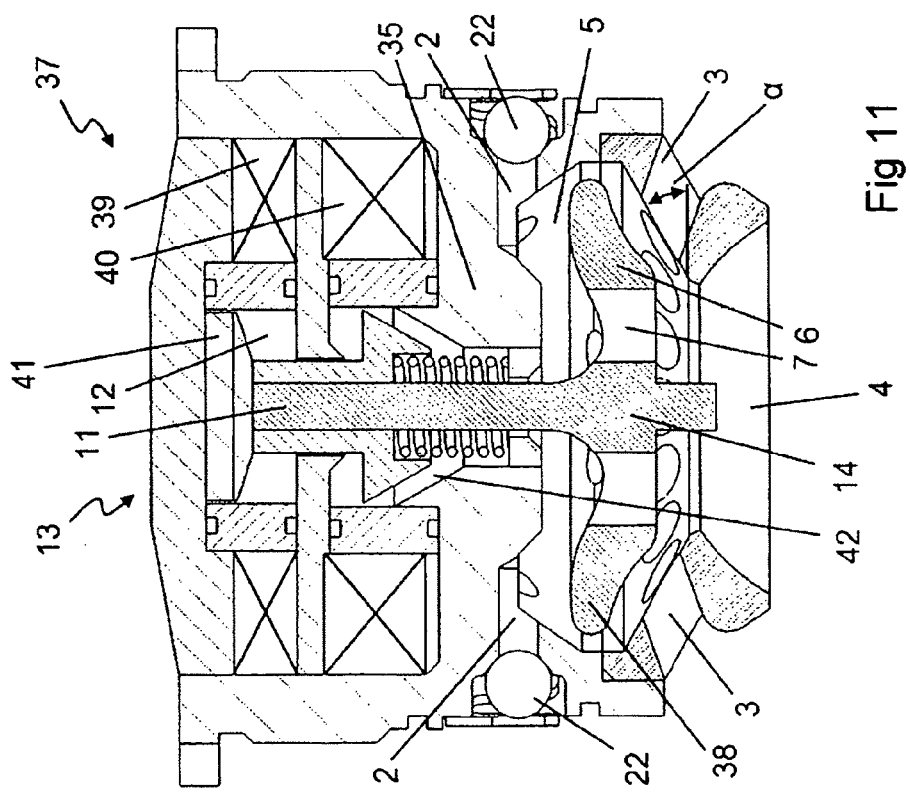
Fig 11
Fig 12

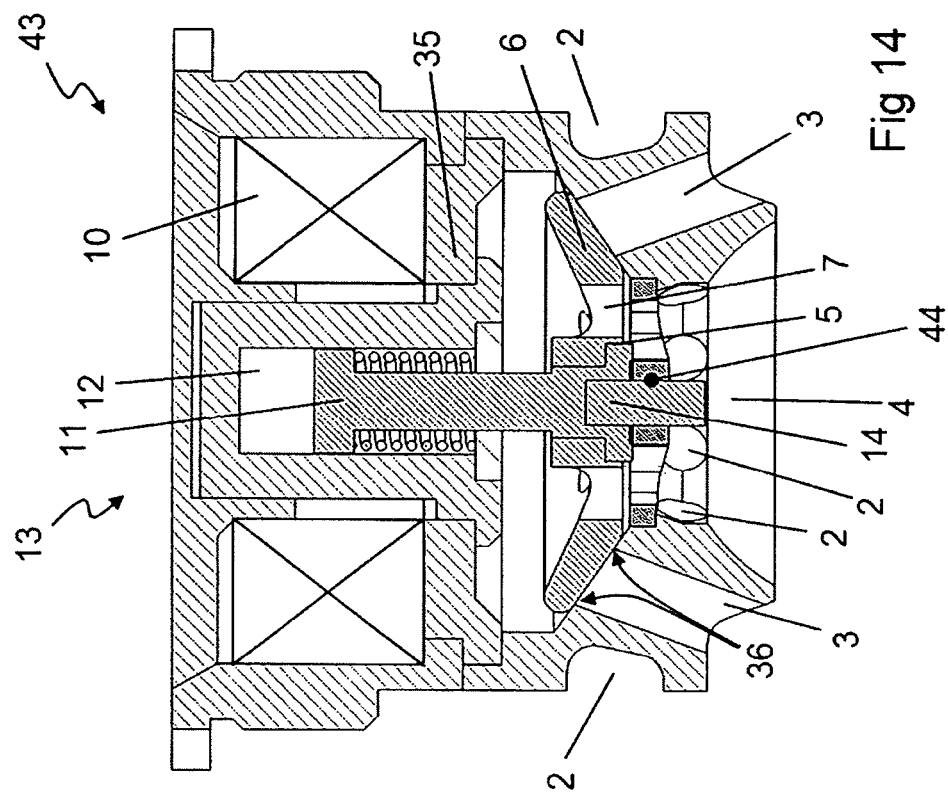
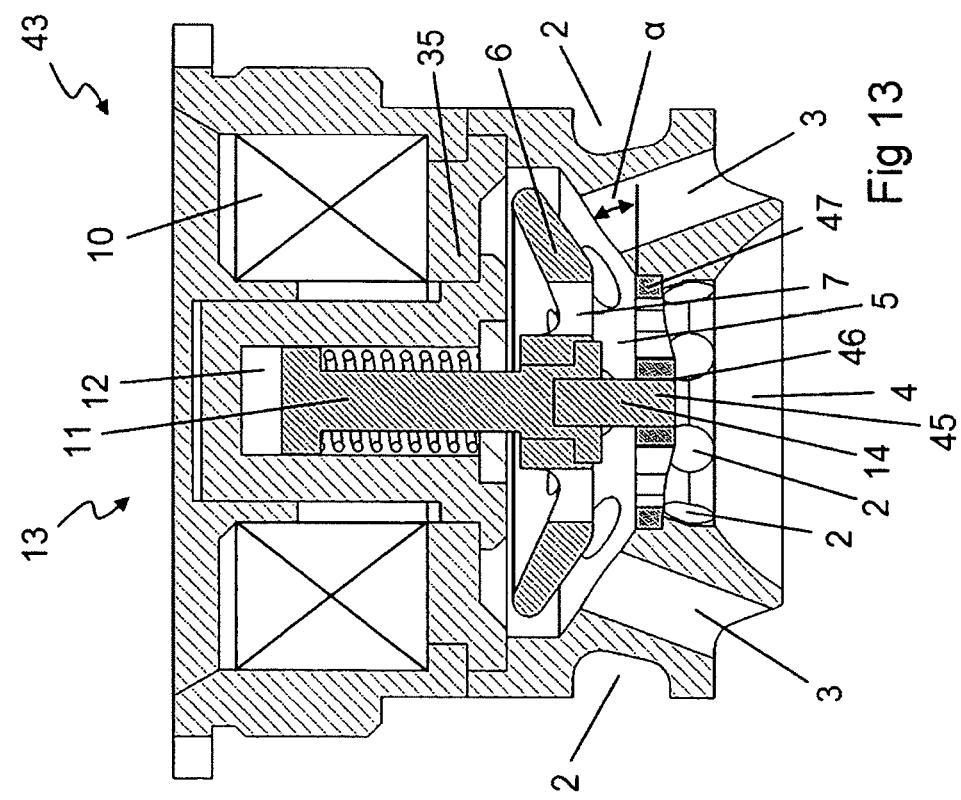

FLUID DISTRIBUTION VALVE

CROSS REFERENCE TO RELATED APPLICATIONS

This application is entitled to the benefit of and incorporates by reference essential subject matter disclosed in International Patent Application No. PCT/DK2009/000240 filed on Nov. 17, 2009 and European Patent Application No. 08020083.5 filed Nov. 18, 2008.

FIELD OF THE INVENTION

The invention relates to a fluid distribution valve, comprising at least a first fluid port, a second fluid port and a third fluid port, connecting to a fluid distribution chamber, wherein said second fluid port can be selectively connected to said first fluid port and/or said third fluid port through said distribution chamber. Additionally, the invention relates to a pumping cylinder arrangement, comprising a hollow cylinder for cooperation with a piston. Furthermore, the invention relates to a fluid working machine.

BACKGROUND OF THE INVENTION

When a fluid reservoir has to be alternatively connected to a plurality of fluid lines (preferably two), fluid distribution valves are used. An example of such fluid distribution valves are the so called changeover valves. In case of changeover valves, comprising two alternate fluid line connections and a common fluid port, the changeover valves are designed in a way that a common fluid port can at least be fluidly connected to either a first fluid line connection or to a second fluid line connection. Depending on the actual design chosen, the changeover valve might also comprise a state, in which both fluid line connections are connected to the common fluid port and/or a state, in which no fluid connection is provided between any of the three fluid ports involved (i.e. the two fluid line connection ports and the common fluid port).

Changeover valves are used in a plethora of technical applications, where fluid connections have to be established and interrupted between several fluid ports. The fluids involved can be of any kind. For example, the fluid involved can be a gas, a liquid, a mixture of a gas and a liquid, a mixture of a gas and a solid (smoke), a mixture of a liquid and a solid (suspension), as well as a mixture of a gas, a liquid and a solid.

One possible technical application for the use of changeover valves are fluid working machines. Such fluid working machines comprise in particular hydraulic pumps, hydraulic motors and machines, being usable as a hydraulic pump and as a hydraulic motor. Such fluid working machines usually comprise one or several cavities of cyclically changing volume. The currently most widely used design for a cavity of cyclically changing volume is the cylinder-and-piston type design. The pumping is performed by a pumping cycle, consisting of a series of individual pumping steps. In the first pumping step, one of the pump's cavities is connected to a low pressure fluid reservoir, as soon as the pumping cavity's volume starts to expand. When the pumping cavity's volume reaches its maximum, the fluid connection between the low pressure fluid reservoir and the pumping cavity is closed and a connection between a high pressure fluid manifold and the pumping cavity is established. As the pumping cavity's volume starts to contract, the fluid, being pressurized within the pumping cavity's volume, is expelled towards the high pressure fluid manifold.

The opening and closing of the valves and/or the changing of the fluid line interconnecting states can be performed by passive means, as well as by active means. An actuation by passive means is done, if the respective valve opens and closes in response to the pressure differences of the fluid itself. Such passive valves can be used in particular for pumping purposes. For example, spring loaded check valves could be used as said passive valves.

Actively actuated valves, however, change their state according to a signal, which is externally applied. The external signal can be a mechanical signal (for example the movement of a cam, mounted on a camshaft), an electrical signal (if an electrically actuated valve is used), and/or a pressure signal (if a hydraulically actuated valve is used). Such actuated valves are used in particular for hydraulic motors and/or for more evolved hydraulic pumps.

Fluid working machines can be designed with separate (passive and/or actively controlled) fluid inlet valves and fluid outlet valves. Examples for such a design of fluid working machines are described in U.S. Pat. Nos. 5,338,160 A and 6,651,545 B2, for example. The drawback of such fluid working machines is in particular that they are using a high number of fluid valves, resulting in a relatively complex and expensive design. Furthermore, the increased number of fluid valves usually results in a more complex actuation scheme of the valves, and in relatively large mounting volume, which has to be provided for the valves.

Therefore, fluid working machines, using changeover valves for alternately connecting the cyclically changing fluid cavities to a low pressure fluid reservoir and a high pressure fluid reservoir, respectively, already have been proposed. An example of such a fluid working machine can be found in WO 2007/034301 A1. Here, the cavities, used for pumping purposes, are connected to either the fluid inlet port or the fluid outlet port by means of a changeover valve.

Another design of a changeover valve, which can be used for switching the fluid flow direction of a high pressure hydraulic medium, is described in U.S. Pat. No. 4,664,150 A.

To reduce the complexity of fluid working machines, it has been proposed in U.S. Pat. No. 7,300,260 A, to arrange the low-pressure fluid reservoir on the inside of the machine, and the high-pressure fluid manifold on the outside of the machine. This way, the lubrication of mechanical parts on the inside of the fluid working machine (such as an eccentric crank or a swash plate) can be done by the low-pressure fluid manifold. Additionally, leakage of hydraulic fluid can be dealt easily with, this way. On the other hand, the high pressure fluid usually needs to be on the outside of the machine, so that it can be used by hydraulic consumers. However, the design disclosed in U.S. Pat. No. 7,300,260 A suffers from a plurality of drawbacks. For example, the volume of the fluid channels between the pumping cavity and the valves show a high "dead volume", causing a low efficiency of the machine. Furthermore, the use of magneto-rheological fluids is expensive and shows relatively high wear.

For minimizing the losses involved with the use of changeover valves in fluid working machines, it is desired that the cross sections of the fluid flow channels are as large as possible. In particular, the fluid flow cross section for a fluid flow between the low-pressure fluid port and the pumping chamber's fluid port, as well as the available fluid flow cross section for a fluid flow between the high-pressure fluid port and the pumping chamber's fluid port has to be as large as possible. Furthermore, the fluid flow channels, leading towards the changeover valve have to have a high cross section, as well.

However, when using changeover valves according to the state of the art together with fluid working machines it was so far not possible to achieve all these requirements at the same time. Instead, a compromise had to be chosen so far. Considering the embodiment shown in FIG. 6 of U.S. Pat. No. 6,651,545 B2, for example, it is clear from the drawing that the fluid channel connecting the pumping cavity with the changeover valve is comparatively small. Therefore, in current designs of fluid working machines the use of changeover valves for the interconnection of low pressure fluid manifolds, high pressure fluid manifolds and pumping cavities plays only a minor role, if at all.

SUMMARY OF THE INVENTION

Therefore, the object of the invention is to provide for an improved design of changeover valves.

It is therefore suggested, to design a fluid distribution valve, comprising at least a first fluid port, a second fluid port and a third fluid port, connecting to a fluid distribution chamber, wherein said second fluid port can be selectively connected to at least said first fluid port and/or said third fluid port through said distribution chamber in a way that said second fluid port is arranged between said first fluid port and said third fluid port. In other words, an arrangement of the fluid ports is chosen, in which (at least) one of the selectively connectable fluid port lies in the middle of the fluid distribution valve. Therefore, a possible arrangement of the fluid ports in the context of fluid working machines can be: "pumping cavity's fluid port—low-pressure fluid port— high-pressure fluid port" or "pumping cavity's fluid port— high-pressure fluid port—low-pressure fluid port" (in the case of a fluid distribution valve, comprising three fluid ports, wherein the different fluid ports are arranged in a somewhat linear direction). Such a design dramatically differs from the current paradigm on how to design changeover valves, in which the changeover fluid port (equivalent to the pumping cavity's fluid port) is always arranged in the middle of the changeover valve. Until now such a design was generally used due to geometrical reasons. However, the inventors surprisingly found an alternative way on how to design fluid distribution valves/changeover valves. The presently suggested design, in which the pumping cavity's fluid port is arranged "on one side" of the distribution chamber (and therefore generally of the fluid distribution valve), has major advantages, in particular in the context of fluid working machines. For example, it is now very easy to design a fluid distribution valve, in which the pumping cavity's fluid port shows a very high fluid flow cross section for the fluid, flowing through the fluid distribution valve. This is particularly advantageous, because fluid can flow through the pumping cavity's fluid port in every position of the fluid distribution valve and hence in almost every state of the fluid working machine (e.g. during a fluid intake stroke and a fluid output stroke of the piston of a piston-and-cylinder hydraulic pump). Therefore, an enlarged fluid flow cross section of the pumping cavity's fluid port can increase the efficiency of the resulting fluid working machine significantly. In the field of fluid working machines, the arrangement of the presently proposed fluid distribution valve can be additionally well suited: For example, the fluid distribution valve can easily be arranged immediately neighbouring the pumping cavity, wherein the pumping cavity's fluid port is connected to the third fluid port. Furthermore, with fluid working machines, it is preferred to design the fluid port, being connected to the low pressure fluid manifold, with a large fluid flow cross section. This is because a certain absolute amount of pressure drop of the fluid flowing through the fluid distribution valve (for example a pressure drop of 0.1 bars) translates to a high relative percentage of the pressure drop on the low pressure side, and therefore to a substantial decrease in efficiency of the fluid working machine. Also, such a pressure drop can lead to cavitation, which could then lead to a damage or even destruction of the fluid working machine. However, with the presently proposed design of the fluid distribution valve, it can be easily achieved to not only design the fluid flow cross section of the pumping cavity's fluid port (for example the third fluid port), but also the fluid flow cross section of the remaining fluid ports (for example the first and/or the second "middle" fluid port) very large. As an example in the field of fluid working machines, the first fluid port can be connected to the high pressure fluid manifold; the second fluid port can be connected to the low pressure fluid manifold and the third fluid port can be connected to the fluid working machine's pumping cavity. Using such an arrangement, it is preferred to design the fluid flow cross section of the second fluid port and the fluid flow cross section of the pumping cavity's fluid port particularly large. With the proposed design, it is even possible to design the fluid flow cross section of the pumping cavity's (in this example the third) fluid port to be essentially of the same size as the fluid flow cross section of the cylinder in a piston-and-cylinder type fluid working machine. The fluid distribution chamber can be a chamber, which can be easily distinguished from one (or more) of the fluid ports (first fluid port, second fluid port and/or third fluid port). However, it is also possible that the fluid distribution chamber essentially falls together with one (or more) of the fluid ports, particularly with the third fluid port (pumping cavity's fluid port).

It is possible to design a fluid distribution valve in a way that at least one of said fluid ports, in particular said first fluid port and/or said third fluid port are fluidly connected to said distribution chamber, preferably essentially independent of the current state of the fluid distribution valve. This way, the design of the fluid distribution valve itself can be particularly simple. In particular, it is possible that said first fluid port and said third fluid port are fluidly connected to each other, preferably essentially independent of the current state of the fluid distribution valve. Additional valves, which might be necessary for the function of the complete machine (for example additional poppet valves in a fluid channel, fluidly connecting to one of the fluid ports) can be arranged at a relatively remote position of the fluid distribution valve. Therefore, such additional valves can easily be designed with a large fluid cross section, reducing fluid flow losses. By the notion "essentially independent", in particular a qualitative meaning is encompassed. This way, the fluid connection can be present in essentially all positions (or even in all positions) of the fluid distribution valve. However, it might be possible that the respective fluid connection is not established while the fluid distribution valve is switching from one state to the other, for example. However, also a quantitative meaning can be encompassed by said notion. This way, the fluid cross section of the respective fluid port (for example the first and/or the third fluid port) can be approximately constant, at least essentially all the times.

It is possible to design the fluid distribution valve with at least one valve head, preferably being movably arranged in said distribution chamber. In this design, it is possible that the valve head effectuates the different fluid distribution patterns of the fluid distribution valve. Since the distribution chamber necessarily connects to the fluid ports (first fluid port, second fluid port and third fluid port), the resulting fluid openings can be used as openings, which can interact with corresponding surface parts of the valve head. When a certain fluid opening contacts the corresponding surface part of the valve head, the opening can be (partially) closed. Preferably, the valve head only interacts with the first fluid port and/or the second fluid port, while the third fluid port (pumping cavity's fluid port) remains unclosed. Even more preferably, the valve head only interacts with the second fluid port, while the first fluid port and the third fluid port remain unclosed. The already mentioned opening and closing of the respective fluid ports can be performed by the movement of said valve head. Preferably, the direction of movement of the valve head is essentially parallel to the surface normal of at least part of the fluid openings, or they enclose only a small angle (e.g. not more than 5°, 10°, 15°, 20°, 25°, 30°, 35°, 40° or 45°). Using such a design, a relatively small movement of the valve head can result in a large change of the fluid flow cross section. Furthermore, it is possible to design the valve head and/or the distribution chamber in a way that the distribution chamber has a guiding effect for the moving valve head. In particular, the distribution chamber ould be provided with guide surfaces to guide the movement of the valve head.

It is possible that the fluid distribution valve is designed in a way that at least one of said valve heads, preferably all of said valve heads, is essentially designed as a one-piece unit. This way, the design of the respective valve head can be particularly simple. Hence, the manufacturing cost of the fluid distribution valve can be reduced. Furthermore, leakage problems, which could arise with a valve head, comprising a plurality of sub-units, can be advantageously avoided.

It is possible to design the distribution chamber of said fluid distribution valve in a way that it shows at least two sub-chambers, distinguishable from each other. In particular, the two sub-chambers can be separated by means of an inter-connecting orifice, which can preferably be opened and closed by means of a valve head, being arranged in said fluid distribution chamber (for example within the first sub-chamber and/or the second sub-chamber). Preferably, the first sub-chamber comprises at least one access port for the first fluid port and/or the third fluid port (pumping cavity's fluid port), while the second sub-chamber comprises at least one access port for the second fluid port. In particular, in this design the fluid channels of the first fluid port, the second fluid port and/or the third fluid port, preferably of the first fluid port and the second fluid port can be arranged in an inter-leaving way. This way, the fluid channels of the respective fluid ports, in particular the fluid channel of the first fluid port and the fluid channel of the second fluid port can "reach past" each other.

Preferably, said valve head of said fluid distribution valve can be designed in a radially extended manner, in particular with a plate-like shape. Using such a design, a relatively light-weight valve head (and therefore a valve head, needing less acceleration energy) can be used for closing and opening the respective fluid openings. Therefore, a highly efficient fluid distribution valve can be achieved. Using such a radially extended and/or plate-like design for the valve head, the fluid pressure differences on the respective sides of the valve head can be advantageously used for supporting the closing and/or opening force of the fluid distribution valve. In particular, the radially extended valve head may show two distinguishable surface areas. The first of said distinguishable surface areas can form a sealing side of the valve head, while the second of said distinguishable surface areas can form a non-sealing side of the valve head. Preferably, the second fluid port and/or the third fluid port lie on the sealing side of the valve head. Even more preferably, the second fluid port can be closed by a contact with the sealing side of the valve head.

It might prove sensible to design said fluid distribution valve in such a way that said valve head comprises at least one, preferably a plurality of openings. Such openings can be particularly arranged in a way that two sides of the valve head, opposing each other in the moving direction of the valve head, are fluidly connected to each other by means of said openings. Using such openings, the fluid can effectively flow at least in part past (i.e. through) the valve head, to provide for a fluid connection between the first fluid port and the third fluid port (and/or the second fluid port). Furthermore, the openings can also reduce the fluid forces, which hinder a movement of the valve head. Therefore, the fluid distribution valve can be even more energy efficient and even faster. Furthermore, the openings in the valve head can allow pressure from the third fluid port and/or the first fluid port to be applied to the non-sealing side of the valve head when it is in its closed position. This way, the sealing tightness on the sealing side of the valve head can be improved. In the aforementioned design with at least two sub-chambers, however, the valve head preferably shows no openings.

It is also possible, to design said fluid distribution valve in a way that said valve head is at least in part reversibly deformable and/or elastic. Using such a design, the sealing tightness of the fluid distribution valve can be advantageously improved. Also, using a reversibly deformable and/or elastic valve head, tolerances (e.g. tolerances in the position of the fluid openings, of the valve head and/or of the mounting position of the valve head) can be easily compensated, which can result in a particularly leakage-proof fluid distribution valve. Therefore, the proposed design can lead towards a particularly efficient fluid distribution valve.

Preferably, said reversibly deformable and/or elastic part of said valve head is arranged at least in part circumferentially on said valve head. In this circumferential region, even an only slightly tilted valve head can lead to a relatively large gap between a fluid opening and its corresponding sealing surface. This can result in a comparatively large leakage opening. The proposed circumferentially arranged reversibly deformable and/or elastic parts can therefore effectively address one of the largest risks for fluid leakage. Therefore, an even more efficient and leakage-proof fluid distribution valve can be provided.

Another design can be achieved, if at least said first fluid port and/or said second fluid port and/or said third fluid port, preferably said first fluid port and/or said third fluid port, comprises at least one axially arranged access port to said distribution chamber. Using such a design, the respective fluid port can be designed to have a fluid flow cross section, which can be particularly large. In particular, it is even possible, to design the respective fluid port to be (essentially) as large as the distribution chamber. The proposed design can result in a fluid distribution valve, showing an even more reduced pressure drop for fluid, flowing through the fluid distribution valve. The fluid distribution valve can therefore be particularly efficient and energy saving.

Also, it is possible to design the fluid distribution valve in a way that at least said first fluid port and/or said second fluid port and/or said third fluid port, preferably said first fluid port and/or said second fluid port, comprises at least one access port, preferably a plurality of access ports, more preferably a plurality of radially arranged access ports to said distribution chamber and/or at least one angularly enlarged access port, preferably at least one angularly enlarged, radially arranged access port to said distribution chamber. In particular, the radially arranged access ports can be arranged to be concentric to and to surround an angularly enlarged third fluid port (pumping cavity's fluid port). Using such a design, it is possible to increase the overall fluid flow cross section of the respective fluid port even further. Thus, it is possible to further reduce the resulting pressure losses during fluid flow and hence to improve the performance of the fluid distribution valve. By an angularly enlarged access port, an access port of a slit-like shape and/or an access port, covering an enlarged angular section can be understood. The enlarged angular section can be larger than 5°, 10°, 15°, 20°, 25°, 30°, 40°, 45°, 50°, 60°, 70°, 80°, 90°, 100°, 110°, 120°, 150°, 180°, 210°, 240°, 270°, 300°, and/or 330°.

Also, it is possible to use at least one valve actuator for said fluid distribution valve, wherein said valve actuator is preferably designed at least in part as an electromagnetic valve actuator. Using such a valve actuator, the position of the fluid distribution valve, and therefore the resulting fluid flow patterns, can be controlled by an externally applied control signal. The control signal can come from an electronic controlling unit. Usually, electronic controlling units can easily generate electric output signals, which can be easily used for controlling an electromagnetic valve actuator. Furthermore, electromagnetic valve actuators are usually very fast and normally show only little delay (or they show at least a reproducible delay) between application of a control signal and movement of the actuator.

It is possible to locate said valve actuator immediately adjacent to or even within said distribution chamber. In this way a minimum of connecting parts, for example the valve stem extending from the valve head to the valve actuator, are required. This can enhance the speed of operation of the fluid distribution valve because connecting parts usually add weight to the moving assembly and therefore slow down the movement of the valve head. Preferably said valve actuator is located towards a non-sealing side of the valve head, in particular in case of a valve actuator, containing openings.

A preferred embodiment of the fluid distribution valve can be achieved, if said valve actuator, in particular an actuating unit of said valve actuator, is fluidly separated from said distribution chamber and/or said first fluid port and/or said second fluid port and/or said third fluid port. This way, the valve actuator and the fluid flowing through the fluid distribution valve do not necessarily interfere with each other. Therefore, it is possible that the parts of the valve actuator and/or the connections to the valve actuator can be made of materials that are not compatible with the fluid. Furthermore, the moving fluid does not necessarily apply dynamic forces to the parts of the valve actuator and/or to the connections. Furthermore heat, which is generated by the valve actuator under the influence of the actuation signals, does not heat up the fluid, flowing through the changeover valve. This way, the application spectra of the proposed fluid distribution valve can be enhanced even further. Furthermore, due to the proposed separation, the individual components can be better optimized for their specific purpose. This can result in an even better fluid distribution valve.

It is possible to provide said fluid distribution valve with at least one additional valve, particularly at least one additional poppet valve, wherein said additional valve is preferably arranged in a fluid channel, fluidly connected to at least one of said first, second and/or third fluid ports, more preferably to said first fluid port. Using such a design, the functionality of the fluid distribution valve can be further enhanced. It should be noted that according to certain embodiments it is possible to arrange one (or several) additional valves at a comparatively large distance from the distribution chamber of the fluid distribution valve. Thus, a broader spectrum of usable types of additional valves can be used. Also, it is possible to easily enhance the size of the respective additional valves. Of course, it is also possible to arrange (part of the) the additional valves nearby the distribution chamber of the fluid distribution valve. It is even possible to arrange the additional valves at a position, neighbouring the distribution chamber of the fluid distribution valve.

Another preferred embodiment of a fluid distribution valve can be achieved if is designed and arranged as a distribution valve for liquids, preferably as a distribution valve for oil, more preferably as a distribution valve for hydraulic oil. This way, the fluid distribution valve can be used as a valve for a hydraulic pump, for example. Because of the already mentioned characteristics and advantages of the proposed fluid distribution valve, such a use is particularly useful. In particular liquids, even more particular relatively high viscous liquids like (hydraulic) oil will show a relatively high fluid resistance, if the fluid flow cross section provided for said oil is not sufficiently large. This, however, will translate into a low efficiency of the resulting fluid working machine.

Furthermore, a pumping cylinder arrangement, comprising a hollow cylinder for cooperation with a piston is proposed, wherein at least one fluid distribution valve according to the previous description is used. Preferably, said fluid distribution valve is arranged at the top of said hollow cylinder. In particular, said fluid distribution valve can be arranged axially at the top of said hollow cylinder. The already mentioned features and advantages of said proposed fluid distribution valve are particularly suited for being used in connection with a pumping cylinder arrangement. In particular, it is possible to increase the fluid flow cross sections of one or several of the fluid ports of the fluid distribution valve, as compared to previously existing fluid distribution valves.

Particularly, it is preferred to design said pumping cylinder arrangement in a way that said third fluid port of said fluid distribution valve is fluidly connected with said hollow cylinder. In this case, it is possible to alternatively connect the pumping cavity's cyclically changing volume with either the first fluid port (which itself can be connected to the low pressure fluid manifold) and/or the second fluid port (which itself can be connected to the high pressure fluid manifold, for example). This way, a pumping action and/or motoring action of the pumping cylinder arrangement can be easily obtained. One should be reminded that it is possible that the first fluid port and/or the second fluid port can be connected to additional valves, like poppet valves.

Furthermore, it is suggested to provide a fluid working machine with at least one fluid distribution valve of the previously described type and/or at least one pumping cylinder arrangement according to the previously described type. The resulting fluid working machine can then analogously show the already described features and advantages of the previously described fluid distribution valves and/or pumping cylinder arrangements.

In particular, it is suggested to design said fluid working machine at least partially as a hydraulic working machine, preferably as a synthetically commutated hydraulic machine. The imminent features of the already described fluid distribution valves and/or pumping cylinder arrangements are particularly well suited for this purpose. Synthetically commutated fluid working machines are also known as digital displacement pumps. They are a subset of variable displacement fluid working machines. The fluid inlet valves and/or the fluid outlet valves of synthetically commutated hydraulic machines are opened and closed by an actuation signal, supplied by an electronic controller during the expanding and/or shrinking phase of the pumping cavities volumes.

Preferably, at least one second fluid port of at least one, preferably of all fluid distribution valves, connect directly to the interior of the fluid working machine. As an example, the connection could be made to a crank case of the fluid working machine. The crank case of fluid working machines is typically connected to the low pressure fluid source such as the fluid reservoir of the fluid working machine. This is usually done to take fluid that leaks out of the pumping cylinders back to the fluid reservoir. Connecting the second fluid ports to the crankcase normally has the advantage in comparison to the prior art that a special extra connection to the second fluid port is not required. Said special extra connection has heretofore been required, and has usually increased the number of parts of the complexity of the fluid working machines. Of course, it is also possible to connect the second fluid port to a low pressure fluid source separate from the interior (crank case) of the fluid working machine where the interior of the fluid working machine is at a slightly lower pressure than the low pressure fluid source.

BRIEF DESCRIPTION OF THE DRAWINGS

The present invention and its advantages will become more apparent, when looking at the following description of embodiments of the invention, which will be given with reference to the accompanying figures, which are showing:

FIG. 6: is a schematic cross section through a second embodiment of a fluid distribution valve in a first position;

FIG. 7: is a schematic cross section through the second embodiment of a fluid distribution valve in a second position;

FIG. 8: is another schematic cross section through the second embodiment of a fluid distribution valve, using a different cross-cut;

FIG. 9: is a schematic cross section through a third embodiment of a fluid distribution valve in a first position;

FIG. 10: is a schematic cross section through the third embodiment of a fluid distribution valve in a second position;

FIG. 11: is a schematic cross section through a fourth embodiment of a fluid distribution valve in a first position;

FIG. 12: is a schematic cross section through the fourth embodiment of a fluid distribution valve in a second position;

FIG. 13: is a schematic cross section through a fifth embodiment of a fluid distribution valve in a first position; and FIG. 14: is a schematic cross section through the fifth embodiment of a fluid distribution valve in a second position.

DETAILED DESCRIPTION OF THE PREFERRED EMBODIMENTS

Figure 1:
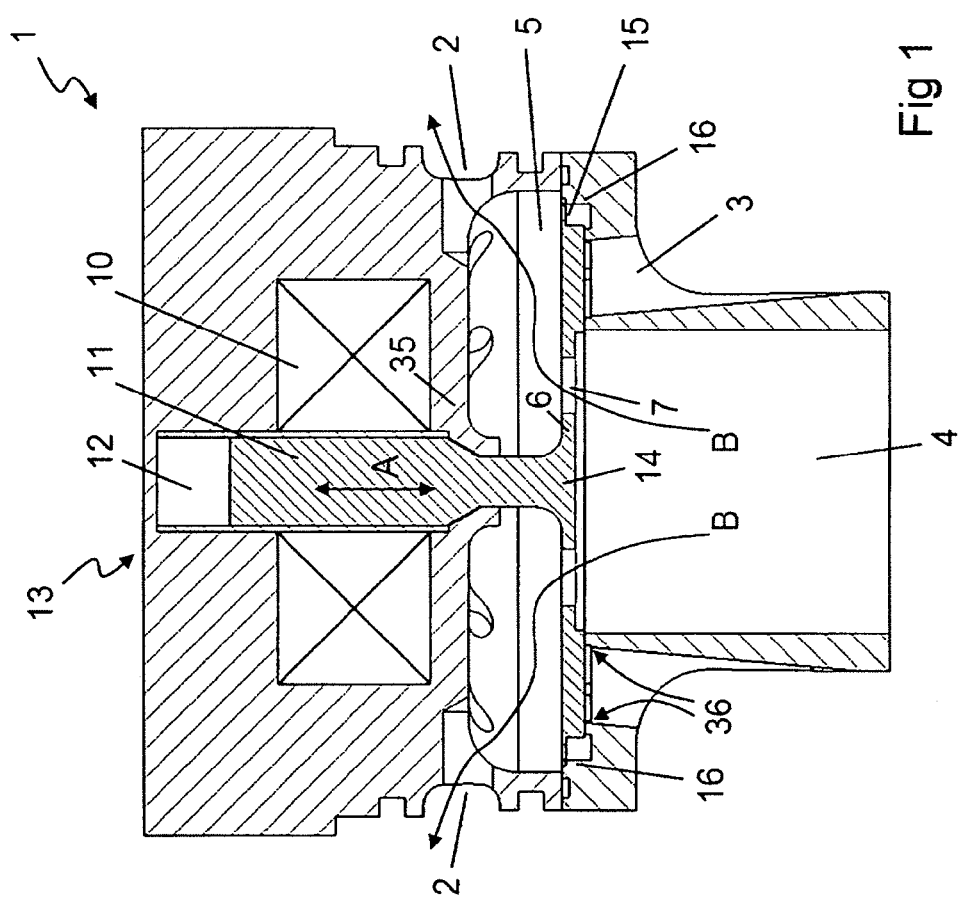
FIG. 1: is a schematic cross section through a first embodiment of a fluid distribution valve in a first position.

In FIG. 1, a schematic cross section through a first embodiment of a fluid distribution valve 1 is shown. The fluid distribution valve 1 comprises a distribution chamber 5, which is centrally located inside the fluid distribution valve 1. In the embodiment shown, three fluid ports 2, 3, 4 connect to the distribution chamber 5: a first fluid port 2, a second fluid port 3, and a third fluid port. The third fluid port 4 works effectively as a changeover fluid port 4. To increase the total fluid cross section area of the first fluid port 2 and the second fluid port 3, each comprise a plurality of smaller access ports in the present embodiment.

A pressure bulkhead 35 is provided to fluidly isolate the electric coil 10 from the fluid within the distribution chamber 5. This design makes the manufacture of the fluid distribution valve 1 considerably easier than those of the prior art. Furthermore, the resulting fluid distribution valve 1 is much more reliable. Preferably, those parts of the pressure bulkhead 35 (or at least parts of it), lying between the electric coil 10 and the distribution chamber 5, is made from a strong and magnetizable material, such as steel. Those parts of the pressure bulkhead 35, defining the wall of the channel 12 for the valve stem 11, however, are preferably made from a non-magnetizable (though preferably strong) material.

The second fluid port 3 and the changeover fluid port 4 are both located on the same side of the valve disc 6, while the valve actuator 13 is located on the other side. The second fluid port 3 is surrounding and/or concentric with the changeover fluid port 4 and rotationally symmetric at steps of typically 60°, 72°, 90° or 120°. The first fluid port 2 may be located on either side of the valve disc 6. In the presently depicted example, however, the first fluid port 2 is arranged on the opposite side of the valve disc 6, as compared to the second fluid port 3 and the changeover fluid port 4.

If the fluid distribution valve 1 is used together with a synthetically commutated hydraulic pump 8 (see FIG. 5), the first fluid port 2 can be connected to the high pressure fluid manifold 23 through a high pressure check valve 22, the second fluid port 3 can be connected to a low pressure fluid reservoir 20 and the changeover fluid port 4 can be connected to one of the pumping cavities 9 of the synthetically commutated hydraulic pump 8.

Within the distribution chamber 5, a plate-like shaped valve disk 6 is arranged. The valve disk 6 is mounted on a valve stem 11 at a mounting point 14. The valve stem 11 can move in the direction of arrow A inside a channel 12, provided within the valve actuator 13 part of the fluid distribution valve 1. The movement of the valve stem 11 is actuated by the valve actuator 13. For this purpose, the valve actuator 13 uses magnetic forces, generated by an electric coil 10. The movement A of the valve stem 11 translates into an up-and-down movement of the valve disk 6 within the distribution chamber 5. In case those parts of the pressure bulkhead 35, lying between the electric coil 10 and the distribution chamber 5 are made from a magnetizable material, the pressure bulkhead 35 can be used for guiding and/or increasing the magnetic flux, generated by the electric coil 10. Those parts of the pressure bulkhead 35, forming the wall of the channel 12 for the valve stem 11, however, should be made from a non-magnetizable material to avoid a direct leak for the magnetic field across the electric coil 10.

In FIG. 1, the fluid distribution valve 1 (i.e. the valve disk 6) is depicted in its lower position. In this position, a fluid connection between the changeover fluid port 4 (e.g. the pumping chamber 9 of a synthetically commutated hydraulic pump 8) and the first fluid port 2 (e.g. the high pressure fluid manifold 23 of a synthetically commutated hydraulic pump 8) is established. When the changeover valve 1 is used in a synthetically commutated hydraulic pump 8, this lower position of the changeover valve 1 corresponds to the valve's position during the pumping stroke (or the motoring stroke). During the pumping stroke, closing the connection through second fluid port 3 to the low pressure manifold 20 (compare to FIG. 5) causes the pressure to rise in the distribution chamber 5 and the pump's cavity 9 connected to the fluid distribution valve 1 at the changeover port 4. A plurality of openings in the valve disc 7 causes the pressure to be applied more or less equally across the valve disc 6, causing it to seal it even more tightly, preventing fluid from escaping through the second fluid port 3. The plurality of openings 7 align with the changeover fluid port 4. Fluid is expelled out of the shrinking pumping cavity 9 towards the high pressure fluid manifold 23 of the pump 8, via a first fluid port 2. This is symbolized by arrows B in FIG. 1. As can be seen in FIG. 1, the fluid flows through the plurality of openings 7, which are provided for this purpose in the valve disk 6. Additionally, the openings 7 in the valve disk 6 reduce the fluid resistance of the valve disk 6, when the valve disk 6 is moved under the influence of the valve actuator 13.

In its lower position the valve disc 6 may seal the second fluid port 3 by making contact with sealing surfaces 36. The sealing surfaces 36 may be provided in form of two concentric rings, arranged concentrically around the changeover port 4. Additionally or alternatively, the sealing surfaces 36 may be provided individually around the individual openings of the second fluid ports 3. This can be done by making contact with the rim 36 of each of the openings of the second fluid port 3. The contact between the second fluid port 3 and the valve disc 6 need not be made simultaneously with all sealing surfaces 36. Instead, the valve disc 6 may be elastically deformable when pressure is applied by the fluid in the distribution chamber 5, so that it may first strike a first surface and then deform elastically to strike another surface, thereby forming a seal on all sealing surfaces 36. The symmetric design of the presently depicted valve disc 6 about the axis of the valve actuator 13 ensures an even distribution of closing and therefore sealing forces across the second fluid port 3, due to both the forces from the valve actuator 13 and the elevated pressure in the distribution chamber 5.

Figure 2:
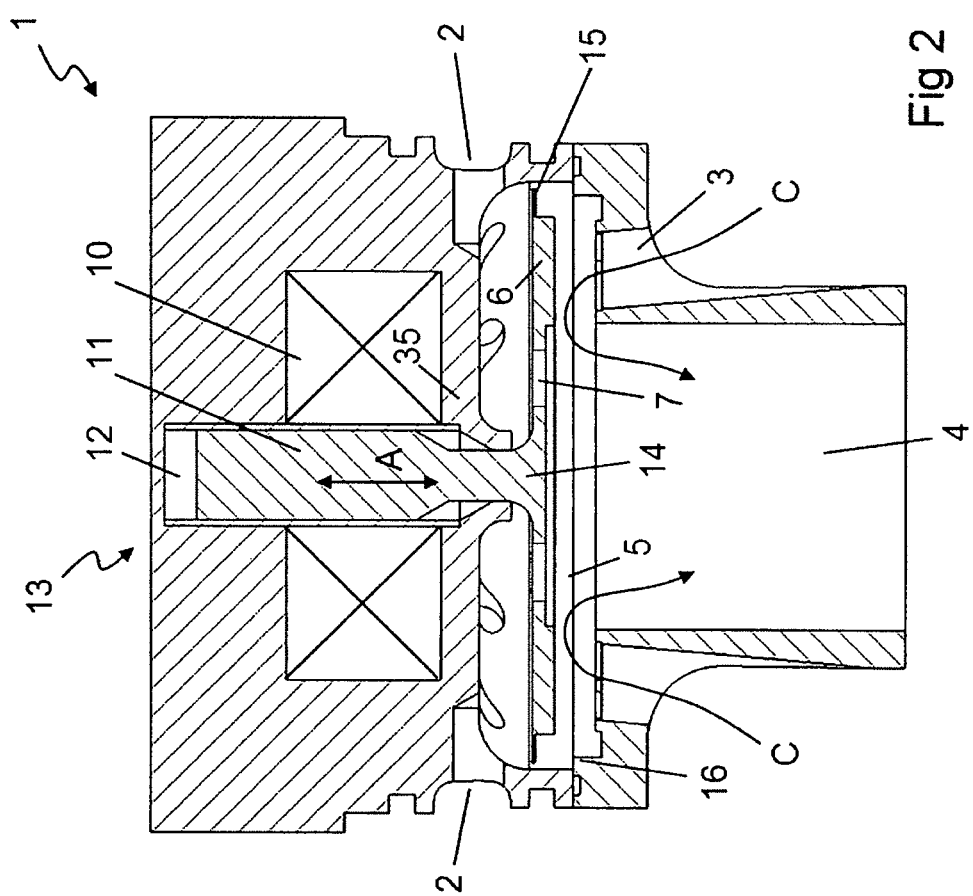
FIG. 2: is a schematic cross section through the first embodiment of a fluid distribution valve in a second position.

In FIG. 2, the fluid distribution valve 1, shown in FIG. 1, is depicted in another position, in which the valve disk 6 of the fluid distribution valve 1 is in the upper position within the distribution chamber 5. In this position, a fluid path C is established between second fluid port 3 (i.e. a low pressure fluid reservoir 20 of a synthetically commutated hydraulic pump 8) and the changeover fluid port 4 (i.e. the pumping cavity 9 of a synthetically commutated hydraulic pump 8). This is symbolized by arrow C. When the changeover valve 1 is used in connection with a synthetically commutated hydraulic pump 8, this corresponds to the position during the intake stroke of the pump 8, during which hydraulic fluid is sucked into the expanding pumping cavity 9 (or the exhaust stroke when hydraulic fluid is pushed out to the low pressure manifold 20 in a motoring mode or exhaust stroke of an idling mode of synthetically commutated hydraulic pump 8). For the embodiment of the fluid distribution valve 1, shown in FIG. 1 and FIG. 2, the closing of the first fluid port 2 during the suction cycle as shown in FIG. 2, is not performed by the valve disk 6 itself. As can be seen from FIG. 2, there is still a remaining gap between the valve disk 6 and the opening, connecting the first fluid port 2 and distribution chamber 5. Instead, the closing is performed by a passive ball-type check valve 22, which is arranged in the fluid output channel 24, connecting the first fluid port 2 to the high pressure fluid manifold 23 of the pump 8 (to reduce the fluid resistance even further, it is also possible to use a plurality of passive ball-type check valves 22). Therefore, the check valve 22 is arranged within the body of the pump 8. Of course, it would be also possible, to provide said check valves 22 within the fluid distribution valve 1 itself (e.g. within the channel part of the first fluid port 2) and/or to design the fluid distribution valve 1 in a way that a tight sealing between the valve disk 6 and the first fluid port 2 is established, when the valve disk 6 is in its upper position.

Figure 3:
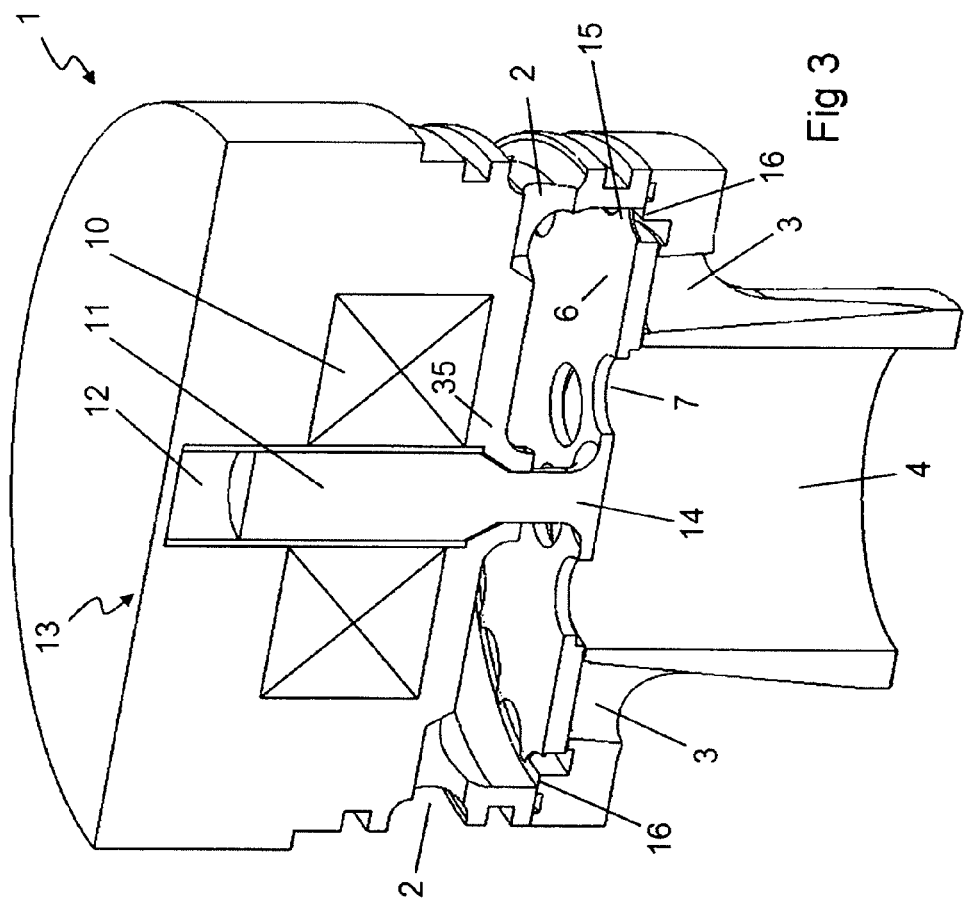
FIG. 3: is a perspective view of a cross-cut through the first embodiment of a fluid distribution valve.
Figure 4:
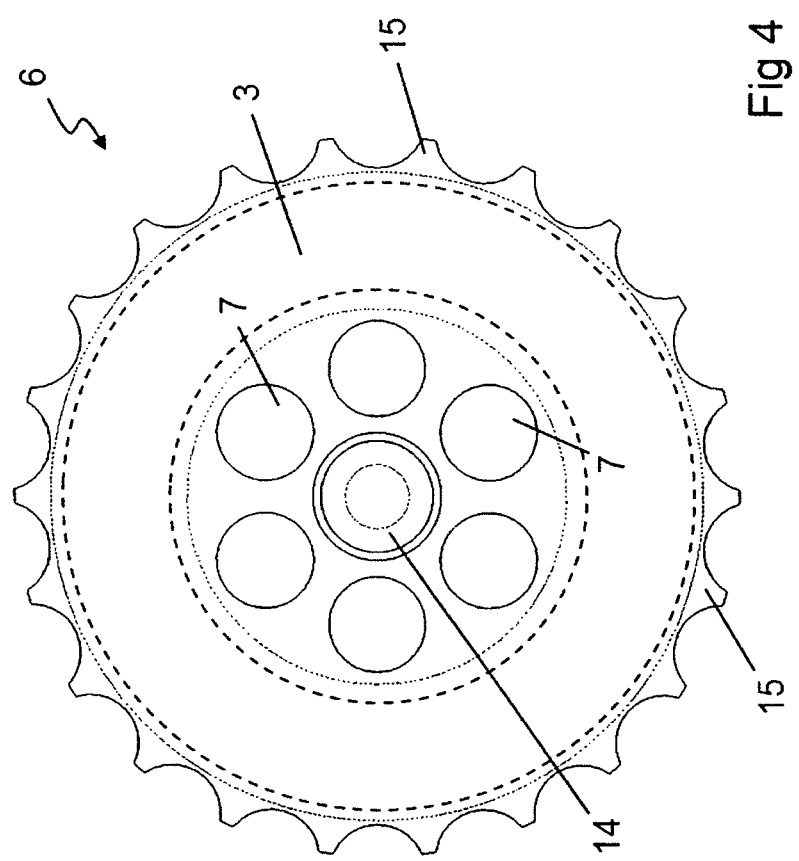
FIG. 4: is a schematic view on a possible embodiment of a valve head of a fluid distribution valve.

More details of the valve disk 6 can be seen in FIG. 3 and FIG. 4. FIG. 3 is a perspective view of a cross-cut through the fluid distribution valve 1, while FIG. 4 shows the valve disc 6 of the changeover valve 1 in a bottom view. As can be seen from the Figs., the presently depicted embodiment of the valve disk 6 comprises a plurality of openings 7, which consist of several circular holes, being symmetrically spaced around the mounting point 14 of the valve disk 6. Of course, it would be also possible to design the openings 7 in a different way, e.g. as a plurality of elongated slots.

Furthermore, it can be seen that the presently depicted valve disk 6 comprises a plurality of extensions 15 on its outer edge. The extensions 15 are made of an elastic material, deforming reversibly under the influence of an externally applied force. The extensions 15 contact a web 16, when the valve disk 6 is approaching its lower position within the distribution chamber 5 (see FIGS. 1, 3). The web 16 is circumferentially arranged within the distribution chamber 5 of the changeover valve 1. The extensions 15 serve essentially two purposes: When the valve disk 6 reaches its lower position, the extensions 15 are contacting the web 16 and are deforming, therefore slowing down the valve disk 6. Therefore, the impact force of the valve disk's 6 surface, when contacting the openings of the second fluid port 3, is reduced. Thus, the wear of the involved parts and the noise, generated by the impact, can be reduced. Furthermore, when the valve disk 6 is moved from its lower position (FIGS. 1, 3) towards its upper position (FIG. 2) by the valve actuator 13, the deformed extensions 15 help to accelerate the valve disk 6 during its initial moving phase. Therefore, the actuation of the changeover valve 1 can be faster and electrical energy consumption for driving the electric coil 10 can be reduced. The extensions 15 also provide an additional fluid path from the second fluid port 3 to the distribution chamber 5 and hence to the changeover port 4. Fluid is therefore able to flow around both sides of the sealing surface part 36 of the valve disk 6, increasing the flow area and reducing the energy loss when fluid flows between the second fluid port 3 and the changeover port 4. Fluid passing through the extensions 15 will also flow through the plurality of openings 7 in the valve disk 6, on its way to and from the changeover port 4.

Furthermore, in particular in FIG. 4, the contact areas between the openings of the second fluid ports 3 and the valve disk 6 can be seen. In FIG. 4, the openings of the second fluid port 3 are depicted as dashed lines.

Figure 5:
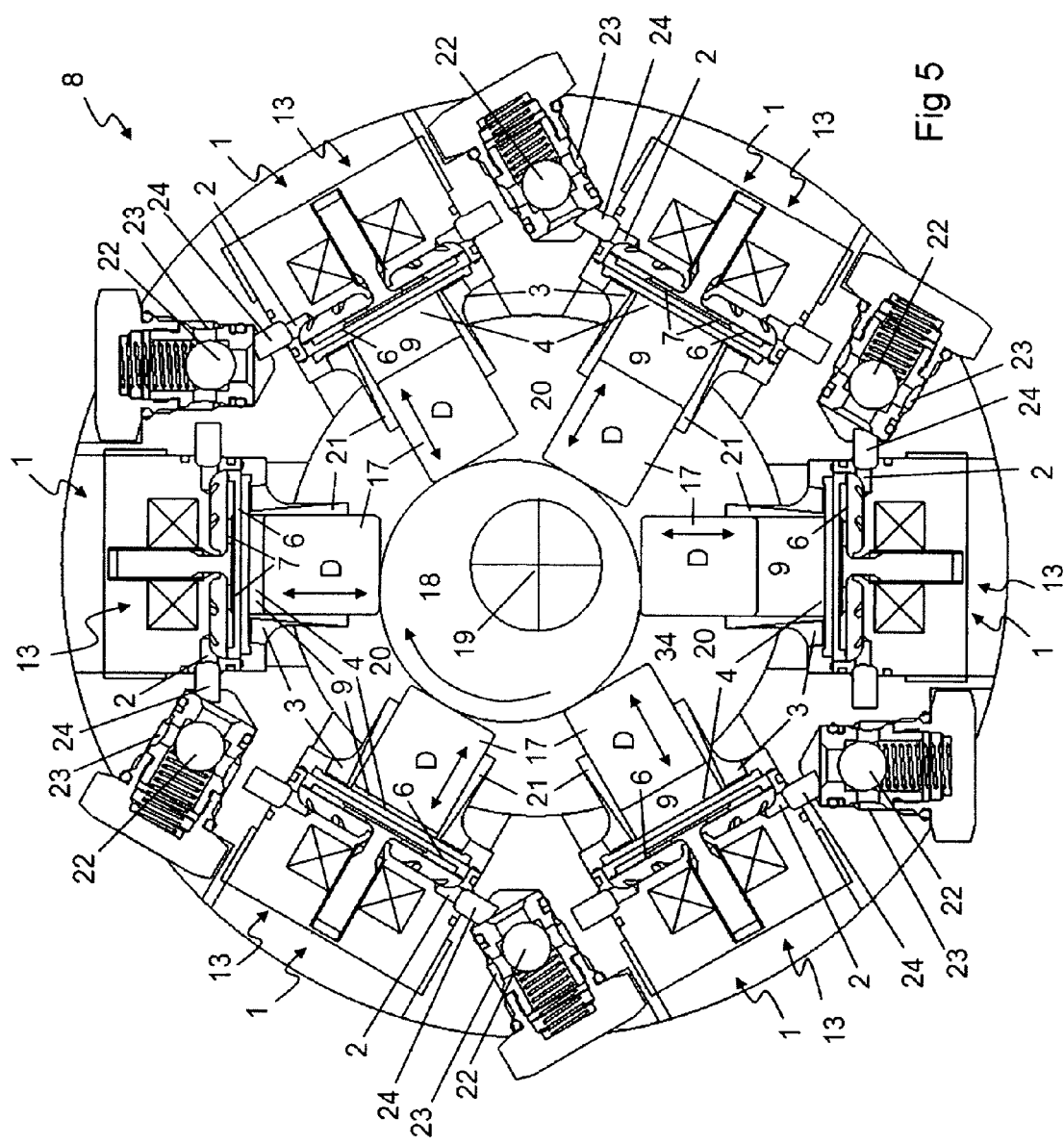
FIG. 5: is a schematic view on a possible embodiment of a synthetically commutated hydraulic pump, using fluid distribution valves.

In FIG. 5, a possible embodiment of a synthetically commutated hydraulic pump 8, using the previously described embodiment of a fluid distribution valve 1 is shown in schematic representation. The synthetically commutated hydraulic pump 8 comprises three cylinders 21, wherein each cylinder 21 is provided with a fluid distribution valve 1. The cylinders 21 have a pumping cavity 9, in which a piston 17 can be moved back and forth (represented by arrow D). Due to the movement of the piston 17, the volume of the pumping cavities 9 can be changed. The movement of the piston 17 is actuated by a cam disk 18, which is eccentrically mounted on a rotatable axis 19. The backward movement of the pistons 17 can be effectuated by a spring (not shown), for example.

During the suction phase of a cylinder 21, the respective piston 17 moves out of the pumping cavity 9, thus increasing the volume of the pumping cavity 9. The valve disk 6 of the fluid distribution valve 1 is moved to its upper position (see FIG. 2). Therefore, the pumping cavity 9 is fluidly connected to the low pressure fluid reservoir 20 via second fluid port 3, distribution chamber 5 and changeover port 4 of the fluid distribution valve 1.

When the piston 17 reaches its bottom-dead centre, the position of the valve disk 6 is changed to its lower position (FIG. 1, FIG. 3). Thus, the fluid connection between pumping cavity 9 and low pressure fluid reservoir 20 is interrupted. When the piston 17 moves into the pumping cavity 9, the fluid, contained inside the pumping cavity 9, is pressurized. Therefore, at some point, the check valve 22, located within the high pressure line 24 and connecting the pumping cavity 9 with a high pressure fluid manifold 23 of the synthetically commutated hydraulic pump 8 via the changeover fluid port 4, the distribution chamber 5, the first fluid port 2 and the check valve 22, will finally open. Therefore, hydraulic fluid is pumped towards the high pressure fluid manifold 23 during the contraction cycle of the cylinder 21. Finally, when the piston 17 has reached its top-dead centre, the position of the valve disk 6 of the changeover valve 1 is changed again.

According to the previous description of the working cycle of the synthetically commutated hydraulic pump 8, a so called full-stroke pumping cycle has been performed. However, it is also possible to effectuate a part-stroke pumping cycle by changing the position of the valve disk 6 of the fluid distribution valve 1 when the piston 17 has reached an intermediary position between its bottom-dead centre and its top-dead centre during the contraction cycle of the cylinder 21. It is even possible to keep the fluid distribution valve 1 in its open position for the whole pumping cycle of the cylinder 21 (i.e. the fluid connection to the second fluid port 3 remains open and hydraulic fluid is pumped back and forth from and into the low pressure reservoir 20). Then, no effective pumping is performed by the synthetically commutated hydraulic pump 8 at all.

Of course, it has to be understood that all of the presently described fluid distribution valves 1, 25, 29, 37, 43 can be used together with the presently described synthetically commutated hydraulic pump 8. It is even possible that variations of the presently described fluid distribution valves 1, 25, 29, 37, 43 are used for this purpose. However, the use within a synthetically commutated hydraulic pump 8 is not necessarily the only use for the presently described fluid distribution valves 1, 25, 29, 37, 43.

In FIG. 6, FIG. 7 and FIG. 8, a second possible embodiment of a fluid distribution valve 25 is depicted. FIG. 6 shows the fluid distribution valve 25 in a position, wherein the changeover fluid port 4 is fluidly connected to the first fluid port 2 (arrow E; corresponding to FIG. 1). FIG. 7 and FIG. 8 show the fluid distribution valve 25 in a position, wherein second fluid port 3 is fluidly connected with the changeover fluid port 4 (arrow F; corresponding to FIG. 2). The design of the fluid distribution valve 25 is quite similar to the design of the fluid distribution valve 1, depicted in FIGS. 1, 2 and 3. Therefore, the same reference numbers are used for similar parts.

One of the major differences between the fluid distribution valve 25 of FIGS. 6, 7 and 8, and the fluid distribution valve 1, depicted in FIGS. 1 to 3, is that the valve head 26 is designed without any openings in the valve head 26. If it is desired to arrange the first fluid port 2 on the opposite side of changeover fluid port 4, and to arrange the second fluid port 3 neighbouring the changeover fluid port 4 (analogously to the changeover valve 1, shown in FIGS. 1 to 3), the present design of the valve head 26 without openings necessitates an internal arrangement of fluid channels 27, 28 inside the fluid distribution valve 1 in a way that the fluid channels 28 of the second fluid ports 3 "reach past" the fluid channels 27 of the first fluid ports 2. This is done by a radial interleaving, an alternating arrangement of the first fluid channels 27 connecting to the first fluid ports 2 and the second fluid channels 28 connecting to the second fluid ports 3 when seen circumferentially around the fluid distribution valve 25. To elucidate the geometrical situation, FIG. 8 shows a cross section through the fluid distribution valve 25 of FIG. 6 and FIG. 7 in a plane that is turned by 22.5°, as compared to the cross sectional plane of FIG. 6 and FIG. 7.

Yet another possible embodiment of a fluid distribution valve 29 is shown in FIGS. 9 and 10. FIG. 9 shows the fluid distribution valve 29 in a position, where the first fluid ports 2 are fluidly connected to the changeover fluid port 4 (corresponding to the situation shown in FIG. 1 and FIG. 6), while FIG. 10 shows a situation where the second fluid ports 3 are fluidly connected to the changeover fluid port 4 (corresponding to the situation shown in FIG. 1 and FIG. 7).

In the embodiment of the fluid distribution valve 29 shown in FIGS. 9 and 10, the valve member 30 is provided with an internal channel 31, fluidly connecting the distribution chamber 5 and the first fluid ports 2. In the present embodiment, a spring-loaded check valve 22 is integrated into the fluid distribution valve 29. Of course, it is also possible to arrange the check valve 32 within a high pressure line 24, provided inside the body of the synthetically commutated hydraulic pump 8 (see FIG. 5). As can be noted from FIG. 9 and FIG. 10, the valve head 33 of the valve member 30 does not show any openings 7 (apart from the internal channel 31, provided in the middle of the valve head 33).

Otherwise, the fluid distribution valve 29, shown in FIG. 9 and FIG. 10 is quite similar to the previously described embodiments of fluid distribution valves 1 (FIGS. 1 to 3) and 25 (FIGS. 6 to 8). Therefore, similar components show the same reference numerals.

A major advantage of the presently suggested fluid distribution valves 1, 25, 29 over fluid distribution valves, known in the state of the art, is that the presently described arrangement of the first fluid port 2 to be opposite of the changeover fluid port 4, and the second fluid port 3 to be neighbouring the changeover fluid port 4 has the advantage that the low pressure fluid reservoir 20 can easily connect to the inside 34 of the synthetically commutated hydraulic pump 8, in particular to an internal cavity 34 inside the pump 8, which has to be provided for the rotating cam 18, the rotating axis 19 and the pistons 17. This internal cavity 34 can be easily filled with hydraulic fluid. This has even the additional advantage that the hydraulic fluid can be used for lubrication purposes as well. Furthermore, any leakage between the moving pistons 17 and the pumping cavity 9 of the cylinders 21 will flow into the low pressure fluid reservoir 20 within the internal cavity 34 inside the synthetically commutated hydraulic pump 8. Furthermore the fluid connection between the distribution chamber 5 and the pumping cavity 9 of a synthetically commutated hydraulic pump 8, i.e. the changeover fluid port 4, can be designed with a particularly large fluid flow cross section. It is even possible to design the changeover fluid port 4 to have essentially the same fluid flow cross section as the pumping cavity 9 of the cylinder 21.

In FIGS. 11 and 12, yet another possible embodiment of a fluid distribution valve 37 is shown. FIG. 11 shows the fluid distribution valve 37 in a first position, in which all fluid ports 2, 3, 4 (i.e. the first fluid port 2, the second fluid port 3 and the changeover fluid port 4) are fluidly connected to each other. In FIG. 12, the fluid distribution valve 37 is shown in a second position, in which only first fluid port 2 and changeover fluid port 4 are fluidly connected through the openings 7 in the valve disc 6, while the second fluid port 3 is closed by the engagement of the valve disc 6 with the sealing surfaces 36 of the second fluid port 3.

As can be seen particularly from FIG. 11, the second fluid port 3 comprises a plurality of radially arranged circular access holes to the distribution chamber 5 of the fluid distribution valve 37. Furthermore, the "entry plane" of the second fluid port 3 is inclined at an angle α with respect to a plane, being arranged perpendicular to the axial direction of the fluid distribution valve 37. In the present embodiment shown, this inclination angle α is chosen to be 30°. However, different angles are possible as well. As an example, an angle α of 5°, 10°, 15°, 20°, 25°, 35°, 40°, 45°, 50°, 55° or 60° could be chosen as well. Consequently, the radially outer part 38 of the valve disc 6 shows an appropriately inclined surface that is pointing towards the second fluid port 3.

This inclined arrangement of the entry plane of the second fluid port 3 at an angle α can have advantages with respect to the resulting fluid flow pattern. In particular, the fluid flow from the second fluid port 3 towards the changeover fluid port 4 can often be improved in a way that less fluid flow losses occur.

Another detail of the presently shown fluid distribution valve 37 is that the check valves 22, sealing the high pressure fluid manifold 23 against the distribution chamber 5 of the fluid distribution valve 37 are integrated within the body of the fluid distribution valve 37. This way, it is possible to provide for a preassembled fluid distribution valve unit 37, in which essentially all moving parts being involved with fluid flow guidance and fluid flow control are implemented into the fluid distribution valve unit 37 itself. This way an easy assembly of the resulting synthetically commutated hydraulic pump 8 can be achieved. Furthermore, by exchanging the fluid distribution valve unit 37, all valves 6, 22 can be removed easily in a single working step. The removed fluid distribution valve 37 can be reworked independently of the synthetically commutated hydraulic pump 8, for example in a machine shop or at the manufacturer of the fluid distribution valve 37.

Another detail which can be seen in FIGS. 11 and 12 is the magnetic actuator, comprising two electrical coils 39, 40 as well as a permanent magnet 41. The permanent magnet 41 is used to hold the valve stem 11 in a latched position, as shown in FIG. 11. Therefore, no electric current is necessary to hold the fluid distribution valve 37 in its upper (latched) position. To move the valve stem 11 from its upper position (FIG. 11) to its lower position (FIG. 12), both the cancellation coil 39 and the actuation coil 40 are activated. The magnetic field generated by the cancellation coil 39 is used for cancelling the magnetic field of the permanent magnet 41. The actuation coil 40 generates a magnetic field which is flowing through the body of the fluid distribution valve 37 and the valve stem 11. The magnetic field generated by the actuation core 40 will cross an inclined gap 42. Here, an attractive force between the body of the fluid distribution valve 37 and the valve stem 11 is generated by the magnetic field of the actuation coil 40, forcing the valve stem 11 together with the valve disc 6 into their lower position as shown in FIG. 12.

In FIGS. 13 and 14 yet another possible embodiment of a fluid distribution valve 43 is shown. In FIG. 13, the fluid distribution valve 43 is shown in a first position, in which the second fluid port 3 is fluidly connected to the distribution chamber 5, while in FIG. 14 the fluid distribution valve 43 is shown in a second position, in which the second fluid port 3 is sealed from the distribution chamber 5 by contact between the second fluid port 3 and the valve disc 6 along the sealing surfaces 36.

Similarly to the example of the fluid distribution valve 37, as shown in FIGS. 11 and 12, the "entry plane" of the second fluid port 3 is arranged as an angle α with respect to a plane standing perpendicular to the axial direction of the fluid distribution valve 43. Different from the example shown in FIGS. 11 and 12, only a single electric coil 10 for moving the valve stem 11 is used. Hence, this feature is similar to the embodiments of fluid distribution valves 1, 25, 29, as shown in FIGS. 1 to 3 and 6 to 10.

Another detail of the fluid distribution valve 43, as shown in FIGS. 13 and 14 is the lower bearing means 44. Here, the valve stem 11 shows a pin like extension 45 which is arranged within the bore 46 of a guiding disc 47. The pin like extension 45 can be moved in an axial direction within the bore 46 of the guiding disc 47. Of course, the guiding disc 47 shows radially arranged openings, so that fluid can flow through the guiding disc 47.

The first fluid port 2 is arranged in the vicinity of the changeover fluid port 4. Both the first fluid port 2 and the second fluid port 3 are designed as a plurality of circular access ports to the distribution chamber 5. The fluid channels of the first fluid port 2 and the second fluid port 3 are radially interleaved, so that they can reach past each other, in a way already described While the present invention has been illustrated and described with respect to a particular embodiment thereof, it should be appreciated by those of ordinary skill in the art that various modifications to this invention may be made without departing from the spirit and scope of the present.

What is claimed is:
1. A fluid distribution valve, comprising:
a valve housing defining a fluid distribution chamber, the valve housing including a top wall connected to a side wall;
a valve head movably arranged in said fluid distribution chamber, the valve head being connected to a valve stem;
a plurality of first fluid ports defined by a plurality of first channels through the side wall of the valve housing, the plurality of first fluid ports being configured to fluidly connect a low-pressure fluid reservoir or a high-pressure fluid manifold to the fluid distribution chamber;

a plurality of second fluid ports defined by a plurality of second channels through the side wall of the valve housing, the plurality of second fluid ports being configured to fluidly connect a low-pressure fluid reservoir or a high-pressure fluid manifold to the fluid distribution chamber; and a third fluid port configured to fluidly connect a pumping cavity to the fluid distribution chamber;

wherein the top wall of the valve housing is positioned opposite the third fluid port and the side wall of the valve housing is positioned circumferentially about the valve stem;

wherein the plurality of first channels and the plurality of second channels are alternatingly disposed around a circumference of the fluid distribution valve;

wherein each of the first fluid ports, the second fluid ports and the third fluid port is connected to the fluid distribution chamber;

wherein said second fluid ports are configured to be selectively connected to said first fluid ports and/or said third fluid port through said distribution chamber; and wherein said valve head is movable between a first position and a second position;

wherein said third fluid port is fluidly connected to said first fluid ports when said valve head is in said first position;

wherein said third fluid port is fluidly connected to said first fluid ports and said second fluid ports when said valve head is in said second position;

wherein said third fluid port's connection to the distribution chamber is not arranged between said first fluid ports' connections to the distribution chamber and said second fluid ports' connection to the distribution chamber; and wherein said third fluid port is fluidly connected to said distribution chamber independent of the current state of the fluid distribution valve.

2. The fluid distribution valve according to claim 1, wherein at least said first fluid ports or said second fluid ports are fluidly connected to said fluid distribution chamber independent of the current state of the fluid distribution valve.

3. The fluid distribution valve according to claim 1, wherein the at least one valve head is designed as a one-piece unit.

4. The fluid distribution valve according to claim 1, wherein said fluid distribution chamber is designed in a way that it shows at least two sub-chambers, being distinguishable from each other.

5. The fluid distribution valve according to claim 1, wherein said at least one valve head is shaped in a radially extended manner.

6. The fluid distribution valve according to claim 1, wherein at least said first fluid ports and/or said second fluid ports and/or said third fluid port comprises at least one axially arranged access port to said fluid distribution chamber.

7. The fluid distribution valve according to claim 1, wherein at least said first fluid ports and/or said second fluid ports and/or said third fluid port comprises at least one access port.

8. The fluid distribution valve according to claim 1, further comprising a valve arranged in a fluid channel fluidly connected to at least one of said first, second and/or third fluid ports.

9. The fluid distribution valve according to claim 1, wherein the fluid distribution valve is designed and arranged as a distribution valve for liquids.

10. The fluid distribution valve according to claim 1, wherein the first channels fluidly connect said first fluid ports to said fluid distribution chamber;

wherein the second channels fluidly connect said second fluid ports to said fluid distribution chamber; and wherein at least a portion of said first channels are radially closer to a longitudinal axis of said valve head than at least a portion of said second channels.

11. The fluid distribution valve according to claim 1, wherein said valve head is at least in part reversibly deformable and/or elastic.

12. The fluid distribution valve according to claim 11, wherein said reversibly deformable and/or elastic part of said valve head is arranged at least in part circumferentially on said valve head.

13. The fluid distribution valve according to claim 1, further comprising at least one valve actuator for moving the valve head in said fluid distribution chamber.

14. The fluid distribution valve according to claim 13, wherein an actuating unit of said valve actuator is fluidly separated from said fluid distribution chamber and/or said first fluid ports and/or said second fluid ports and/or said third fluid port.

15. A pumping cylinder arrangement, comprising:
a hollow cylinder for cooperation with a piston; and
a fluid distribution valve according to claim 1 arranged on said hollow cylinder.

16. The pumping cylinder arrangement according to claim 15, wherein said third fluid port of said fluid distribution valve is fluidly connected with said hollow cylinder.

17. A fluid working machine, comprising:
a high-pressure fluid manifold;
a pumping cylinder arrangement including a hollow cylinder and a piston reciprocatingly moving in the hollow cylinder; and
a fluid distribution valve comprising:
a valve housing defining a fluid distribution chamber, the valve housing including a top wall connected to a side wall;
a valve head movably arranged in said fluid distribution chamber, the valve head being connected to a valve stem;
a plurality of outlet fluid ports defined by a plurality of outlet channels through the side wall of the valve housing, the outlet fluid ports fluidly connecting the high-pressure fluid manifold to the fluid distribution chamber;
a plurality of inlet fluid ports defined by a plurality of inlet channels through the side wall of the valve housing, the inlet fluid ports being fluidly connected to the fluid distribution chamber;
a changeover fluid port configured to fluidly connect the hollow cylinder to the fluid distribution chamber;
wherein the top wall of the valve housing is positioned opposite the changeover fluid port and the side wall of the valve housing is positioned circumferentially about the valve stem;
wherein the plurality of inlet channels and the plurality of outlet channels are alternatingly disposed about a circumference of the fluid distribution valve;
wherein each of the outlet fluid ports, the inlet fluid ports and the changeover fluid port is connected to the fluid distribution chamber;

wherein said inlet fluid ports are configured to be selectively connected to said outlet fluid ports and/or said changeover fluid port through said distribution chamber; and wherein said valve head is movable between a first position and a second position;

wherein said changeover fluid port is fluidly connected to said outlet fluid ports when said valve head is in said first position;

wherein said changeover fluid port is fluidly connected to said outlet fluid ports and said inlet fluid ports when said valve head is in said second position;

wherein said changeover fluid port's connection to the distribution chamber is not arranged between said outlet fluid ports' connections to the distribution chamber and said inlet fluid ports' connections to the distribution chamber;

wherein said changeover fluid port is fluidly connected to said distribution chamber independent of the current state of the fluid distribution valve.

18. The fluid working machine according to claim 17, wherein said fluid working machine is at least partially designed as a hydraulic working machine.

19. The fluid working machine according to claim 17, wherein the inlet fluid ports are positioned closer to the changeover fluid port than the outlet fluid ports.

20. The fluid working machine according to claim 17, wherein the outlet channels fluidly connect said outlet fluid ports to said fluid distribution chamber;

wherein the inlet channels fluidly connect said inlet fluid ports to said fluid distribution chamber; and wherein at least a portion of said outlet channels are radially closer to a longitudinal axis of said valve head than at least a portion of said inlet channels.

* * * * *